Feb. 25, 1969  C. PELOT  3,429,211
APPARATUS FOR TRIMMING THE NECK OF HOLLOW PLASTIC ARTICLES
Filed Dec. 27, 1965  Sheet 1 of 2

United States Patent Office 3,429,211
Patented Feb. 25, 1969

3,429,211
APPARATUS FOR TRIMMING THE NECK OF HOLLOW PLASTIC ARTICLES
Claude Pelot, Besancon, Dubbs, France, assignor to Solvay & Cie, Brussels, Belgium, a Belgian company
Filed Dec. 27, 1965, Ser. No. 520,301
Claims priority, application France, Dec. 30, 1964, 377
U.S. Cl. 82—46    6 Claims
Int. Cl. B26d 1/02; B23b 5/00

ABSTRACT OF THE DISCLOSURE

Apparatus for cutting flash from the necks of molded hollow plastic bodies comprises stationary guide means and movable guide means which engage grooves in the necks of the bodies and transport the bodies by their necks past a deflashing tool which is adjustably positioned relative to the stationary guide means so as to achieve uniform deflashing.

---

The present invention relates to a method of deflashing the neck of hollow bodies of plastic material after removal from the mould and cooling, and also to an apparatus which is particularly suitable for carrying out said method.

Up to the present time the deflashing of hollow bodies of plastic material, such as bottles, has most usually been effected manually at the outlet of the mould with the said apparatus which does not enable a rate equal to that of the moulding machines to be attained. It is thus generally necessary to immobilise a number of operators in order to achieve a sufficient rate of productivity, thus considerably increasing the cost price of the finished products.

Various appliances have been proposed for carrying out this operation mechanically, but such appliances are generally expensive, complex, and difficult to adjust or else have insufficient output.

The applicant has now developed a method and an apparatus for carrying out such method, which permit correct deflashing of the neck of moulded hollow bodies, with a very high output and great regularity of operation.

In the process according to the present invention, the neck flash is progressively cut away by a fixed cutting tool while the hollow bodies are moved transversely so that their longitudinal axis is always perpendicular to the cutting tool, while at the same time said hollow bodies perform a movement of rotation about their longitudinal axis.

This progressive cutting effected over the entire periphery of the neck of the hollow bodies permits very regular deflashing.

The invention also relates to an apparatus which is particularly suitable for carrying out this process and which enables very great productivity to be achieved.

The apparatus according to the invention comprises a device for driving the hollow bodies which is constituted by a fixed guide and a movable guide gripping said hollow bodies at their neck and effecting their transversal displacement while imparting to them a simultaneous movement of rotation about their longitudinal axis, and also an adjustable cutting tool disposed obliquely in relation to the trajectory described by the longitudinal axes of said hollow bodies and perpendicularly to said axes.

In the apparatus according to the invention the hollow bodies to be deflashed are therefore gripped by their neck, which is the most rigid part and practically the only part to be standardised. In this manner, any possible deformation of the hollow body to be treated is eliminated, while in addition the apparatus is independent of the shape of these hollow bodies, thus permitting the finishing of hollow bodies of various shapes without requiring adjustment.

The process according to the invention is moreover explained in detail in the description which is given below of an apparatus particularly suitable for carrying it out. It is nevertheless clearly understood that this description is given solely by way of illustration and without limitation, because the method and the apparatus may undergo variations which do not depart from either the scope or the spirit of the invention.

In this description reference is made to the figures of the accompanying drawings, in which.

Figure 1:
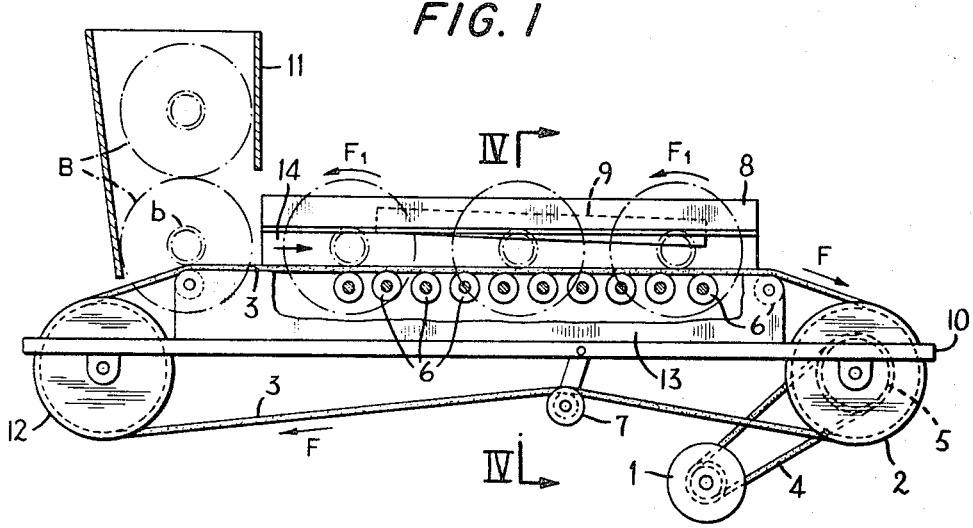
FIGURE 1 is a view in elevation of the deflashing apparatus.
Figure 2:
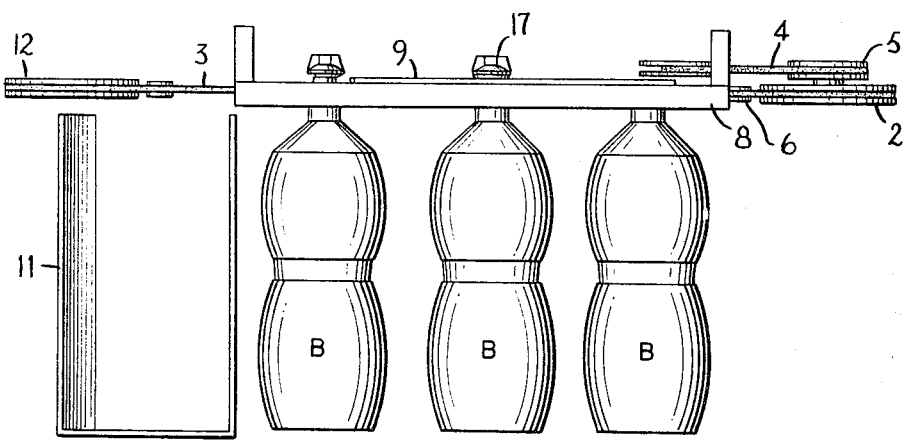
FIGURE 2 is a plan view of the same apparatus.

As can be seen in the drawings, the apparatus is composed by a frame 10 supporting a fixed guide 8, a movable guide 3, and a feed corridor 11. The upper guide 8, which is preferably made of mild steel, may be adjusted by any suitable means, particularly by means of apertures provided in the frame 10, so as to be adapted to the diameter of the neck of the hollow body to be deflashed. The feed corridor 11 is of suitable shape and material, for example of aluminium. The hollow bodies B to be treated are delivered into said corridor by any means known per se and not illustrated, such as a belt, a pneumatic conveyor, a bladed chain, or the like.

At the bottom of the feed corridor 11 the necks b of the hollow bodies B come in sucession, level with a groove 18 provided on said neck, into contact with a movable guide 3 of suitable form which drives said hollow body, while imparting to it a movement of rotation, to a passage 14 formed by the guide 3 itself and the adjustable top guide 8.

On said adjustable guide 8 an adjustable deflashing tool 9 is mounted, such as a blade, of suitable material and preferably of tempered steel. This deflashing tool is disposed obliquely in relation to a fixed guide 8.

The movable guide 3 is constituted by an endless belt, preferably of circular section.

The endless belt 3 is operated by an ordinary pulley 12 on the left hand side and by a driving pulley 2 on the right hand side, while said pulleys may be grooved. The belt 3 may be of reinforced braid impregnated in any manner and with any suitable material, for example neoprene. The pulley 2 is integral in rotation with the pulley 5 mounted on the same shaft, said pulley 5 being driven by means of the belt 4 by a geared motor 1.

The endless belt 3 is not driven directly, in order to permit the speed of the machine to be varied by simply changing the pulley 1' of the reduction gear 1. It is thus possible to have a wide range of speeds exceeding what has been possible by other means up to the present time.

Transmission may be effected by means of a belt 4 of suitable shape, for example a V-belt.

A tensioning roller 7 enables the tension of the endless belt 3 to be adjusted.

The rollers 6 of circular shape may be grooved and are made of suitable material, for example nylon, are mounted on ball bearings, and are fixed in a suitable manner, for example with the aid of threaded axles on the bottom fixed guide 13 so as to support the endless belt 3 over the length necessary for deflashing the bottle B.

The container B is advanced in the direction indicated by the arrow F, the neck b being in contact with the endless belt 3 so that it rotates in the direction indicated by the arrow F1 (FIGURE 1) and is driven towards the guide 8 on which it is then supported (FIGURES 1, 2, 4 and 5).

As the neck $b$ is held against the guide 8 by the endless belt 3 which applies pressure to it, the container B then advances in the passage 14 formed by the endless belt 3 and the guide 8, over a suitable length; as it passes therethrough the neck $b$ encounters the adjustable cutter 9, a steel cutting blade, which is so positioned that it is situated just at the point of the neck $b$ to be cut through. This adjustable cutter 9 is not parallel to the guide 8, and it reduces the passage 14 so as to penetrate into the necks as the latter move towards the outlet of the machine in order to effect complete severance and detachment of the part 17 cut off from the container.

The belt 3 may be replaced by a bladed metal chain which engages in the groove 18 of the top of the bottle B, the deflashing process remaining the same but the driving pulleys being replaced by pinions.

Figure 3:
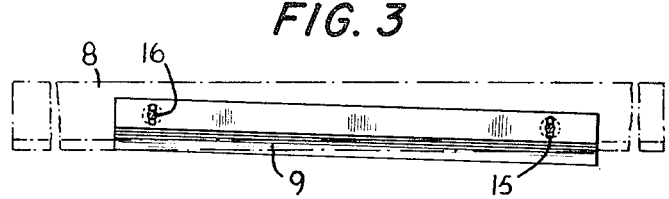
FIGURE 3 is a detail view showing the mounting of the deflashing tool.
Figure 4:
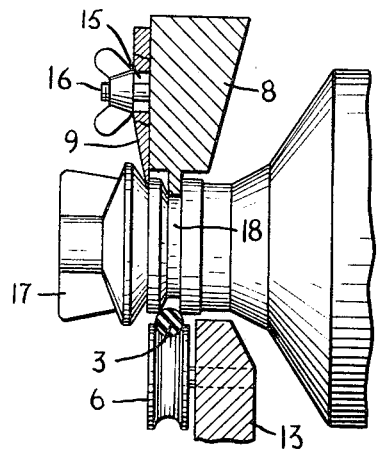
FIGURE 4 is a detail view showing the neck of a hollow body in contact with the deflashing tool, in a section on the line IV—IV in FIGURE 1.
Figure 5:
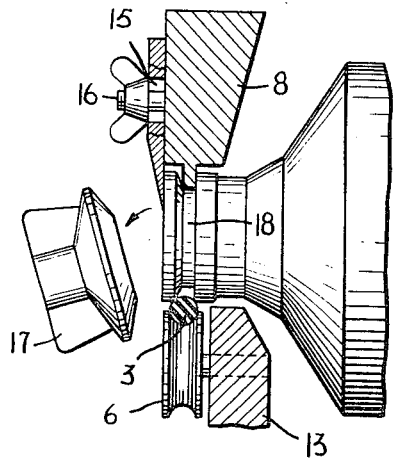
FIGURE 5 is a detail view in section showing the hollow body at the end of the deflashing cycle.

In FIGURE 3 it is possible to see the knife 9 mounted on the top guide 8, said knife 9 having apertures 15, a screw 16 enabling it to be fixed to the top guide 8 while varying the penetration of the knife 9 inside the passage 14.

The apparatus may operate in the horizontal or vertical position; in both cases the bottles are suspended.

After the deflashing or cutting through of the superfluous portion 17 of the neck $b$, the bottles fall by their own weight into any suitable container, particularly, if desired, into a pneumatic tube intended to transport them to any desired point, particularly a storage hopper.

I claim:

1. Apparatus for cutting the flash from the necks of hollow bodies of plastic material as they are moved along a path of travel, said necks having annular abutments comprising a stationary guide means and a movable guide means extending along said path of travel and engageable with the necks of said bodies between them and thereby transport said hollow bodies along said path while simultaneously rotating them about their own axes, and cutting means associated with said stationary guide means to engage the necks of said hollow bodies and cut the flash therefrom, said stationary guide means engaging said annular abutments of said necks to position said bodies in predetermined relation to said cutting means and thereby assure regular deflashing.

2. Apparatus according to claim 1, in which said cutting means comprises a stationary cutting tool and means for mounting said cutting tool in variable selected position relative to said stationary guide means.

3. Apparatus according to claim 1, in which said annular abutments comprise a groove in the neck of each of said bodies, and in which said stationary guide means comprises a guide engaging in said groove.

4. Apparatus according to claim 3, in which said movable guide means comprises a belt engageable with said groove in the neck of each of said bodies.

5. Apparatus according to claim 1, in which said stationary guide means and moveable guide means engage only the necks of said bodies and constitute the sole means for supporting said bodies during deflashing.

6. Apparatus according to claim 1, in which said stationary guide means and movable guide means have equidistantly spaced portions engaging opposite sides of the necks of said bodies during deflashing, and in which means is provided for increasing and decreasing the distance between said spaced portions of said stationary guide means and said movable guide means.

References Cited

UNITED STATES PATENTS

| | | | |
|---|---|---|---|
| 2,321,735 | 6/1943 | Clifford | 82—46 |
| 2,556,965 | 6/1951 | Gomez | 83—54 |
| 2,571,904 | 10/1951 | Lofgren | 83—109 X |
| 3,233,613 | 2/1966 | Korber et al. | |

ANDREW R. JUHASZ, *Primary Examiner.*

U.S. Cl. X.R.

18—5; 83—54, 431, 435, 914